United States Patent [19]

Fisher

[11] Patent Number: 4,482,211
[45] Date of Patent: Nov. 13, 1984

[54] ELECTRICALLY OPERATED REMOTE CONTROL REARVIEW MIRROR

[75] Inventor: Robert J. Fisher, 14225 Livonia Crescent, Livonia, Mich. 48154

[73] Assignee: Robert J. Fisher, Livonia, Mich.

[21] Appl. No.: 449,100

[22] Filed: Dec. 13, 1982

[51] Int. Cl.³ .................. G02B 7/18; F16H 35/10
[52] U.S. Cl. ................... 350/637; 74/89.15; 74/411
[58] Field of Search ............ 350/289; 248/481, 482, 248/900; 74/89.15, 411, 412 TA

[56] References Cited

U.S. PATENT DOCUMENTS

| | | | |
|---|---|---|---|
| 3,549,243 | 12/1970 | Horwitt et al. | 350/289 |
| 3,972,597 | 8/1976 | Repay et al. | 350/289 |
| 3,978,735 | 9/1976 | Repay et al. | 74/89.15 |
| 4,041,793 | 8/1977 | Repay et al. | 74/499 |
| 4,131,029 | 12/1978 | Harbaugh et al. | 74/89.15 |
| 4,202,603 | 5/1980 | Miyauchi | 350/289 |
| 4,273,417 | 6/1981 | Mittelhauser | 350/289 |
| 4,324,454 | 4/1982 | Kumai | 350/289 |

FOREIGN PATENT DOCUMENTS 775479  10/1980  U.S.S.R. ............................ 74/89.15

*Primary Examiner*—Jon W. Henry
*Attorney, Agent, or Firm*—Cullen, Sloman, Cantor, Grauer, Scott & Rutherford

[57] ABSTRACT

An electrically powered remotely controlled rearview mirror comprises a pair of mirror-engaging position-adjusting non-rotatable screw shafts, each caused to move longitudinally by a rotatable ball nut received within a spherically socketed annular pinion gear which is rotatably driven by a worm gear on the output shaft of the motor. The ball and socket connection between the ball nut and pinion gear permit the axes of the nut and screw shaft to skew relative to that of the pinion gear. A pair of splines on the interior of the pinion gear engage slots on the spherical surface of the ball nut to establish a driving relationship for simultaneous rotation when the associated motor is actuated.

4 Claims, 5 Drawing Figures

ELECTRICALLY OPERATED REMOTE CONTROL REARVIEW MIRROR

BACKGROUND AND SUMMARY OF INVENTION

The present invention relates to drive systems for adjusting the position of a remotely controlled electrically operated automotive rearview mirror.

It is known in the prior art to adjust the position of an outside rearview mirror by means of electrically driven rotatable nuts which cause longitudinal non-rotary movement of two screws which engage the mirror backing plate to cause it to pivot about each of two mutually perpendicular axes. The rotatable nuts may be driven by either a single motor-driven worm gear which selectively pivots into engagement with one or the other of the nuts or by two sets of motors and worm gears.

Representative of such prior art patents are U.S. Pat. Nos. 3,972,597, 4,041,793, 4,273,417 and 4,324,454.

It is also known to provide an override feature by which the motor is permitted to continue to run after the mirror has reached the limit of its movement, or, conversely, to permit the mirror to be manually shifted when the motor is not operating. Such override feature has been achieved, for example, by use of a split nut which permits the nut to rotate without causing longitudinal movement of the screw or permits the screw to move longitudinally without rotation of the nut. The segments of the split nut are resiliently biased in a radially inward direction to normally maintain a driving engagement with the threads of the screw. However, in an overload condition, the nut segments resiliently yield radially outwardly to disengage the driving relationship between the screw and nut threads. Exemplary of such a split nut is the drive system found in the aforementioned U.S. Pat. No. 4,041,793.

The present invention is directed to the creation of an alternative and improved override construction and to the provision of a screw and nut drive system which operates smoothly and uniformly irrespective of the angle of the mirror and the degree of travel of the mirror along its arc of pivotal movement.

The foregoing objects have been accomplished by the use of a three-piece assembly comprising a worm gear-driven pinion gear having a spherical socket which receives a ball-shaped drive nut splined for co-axial rotation with the pinion gear, and internally threaded to receive a screw member having radially inwardly and resiliently yieldable male thread segments. The ball-socket relationship of the pinion gear and nut permit the axis of the nut, and therefore the axis of the screw, to pivot or skew relative to the fixed axis of the pinion gear, while the splined connection between the spherically socketed bore of the pinion gear and the ball-shaped exterior of the nut permit uniform simultaneous rotation of such members whether their axes are coaxial or skewed. This feature permits the connection of the screw to the mirror to follow the arcuate travel of the mirror as its position is adjusted by the screws, with a smooth and uniform driving relationship irrespective of the angle of the mirror.

DETAILED DESCRIPTION OF THE INVENTION

Figure 1:
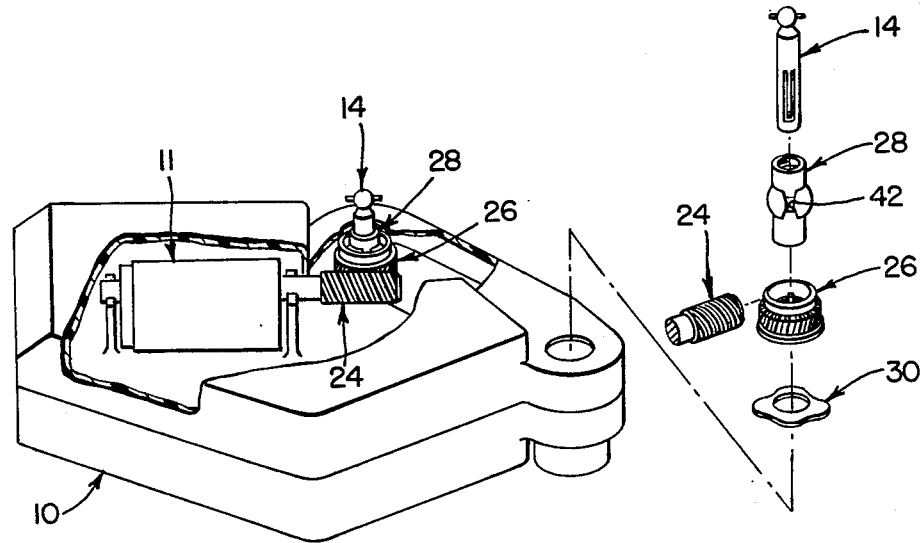
FIG. 1 is a partially exploded perspective view of the motor housing, with a portion of the housing being broken away to reveal one of the two drive systems and with a portion of the other drive system being shown in exploded form.
Figure 2:
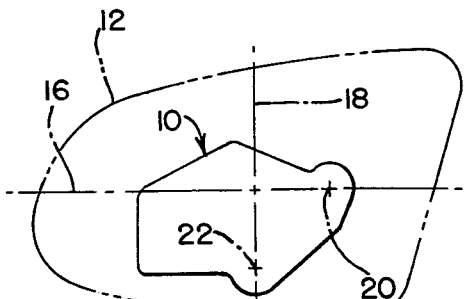
FIG. 2 is a front view of the motor housing shown with the mirror housing outlined in phantom and showing the two pivot axes of the mirror assembly.

Referring first to FIGS. 1 and 2 of the drawings, there is illustrated the motor housing 10 which contains a pair of identical motors 11 and associated drive assemblies, only one of such motors being illustrated in simplified form in FIG. 1. In FIG. 2, the silhouetted outline of motor housing 10 is shown within the outline of the mirror housing 12 shown in phantom. Each of the motors drives an actuator screw 14, one of which causes movement of the mirror about horizontal pivot axis 16 and the other of which causes pivotal movement of the mirror about vertical pivot axis 18 as a result of the connection of such screws to the mirror at actuator connection points 20 and 22. The intersection of axes 16 and 18 represents the point of universal attachment of the mirror to the unillustrated pedestal or base upon which the mirror is conventionally mounted.

Figure 3:
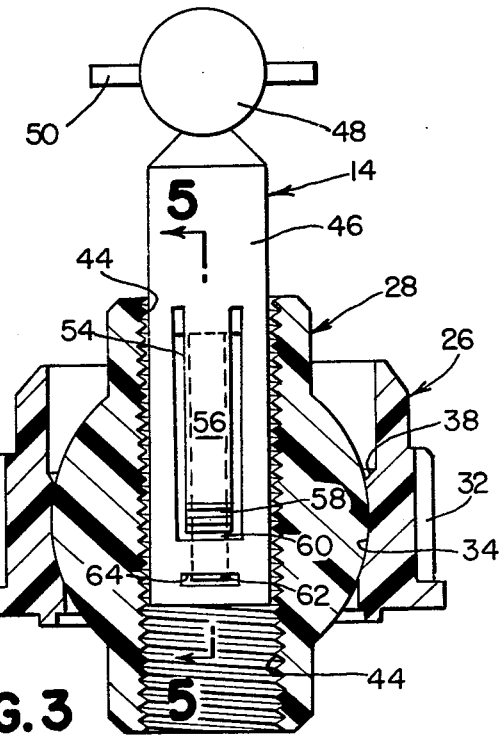
FIG. 3 is a sectional view through the assembled pinion gear, nut and screw.

As shown in FIGS. 1 and 3, each of the drive systems comprises a motor-driven worm gear 14 which engages the periphery of pinion gear 26. The other components of the drive system comprise a ball-shaped drive nut 28, which cooperates with actuator screw 14, and a wave washer 30 which provides a resilient thrust bearing surface between one end of pinion gear 26 and the interior of motor housing 10 which prevents excess axial play and vibration. The upper end of the actuator screw 14 protrudes through an opening in motor housing 10.

Figure 4:
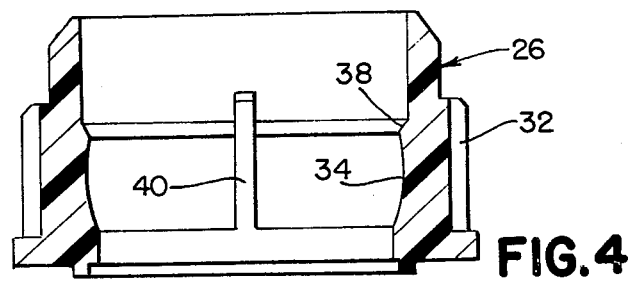
FIG. 4 is a sectional view similar to FIG. 3, but illustrating only the pinion gear.

As best shown in FIGS. 3 and 4, the exterior periphery of pinion gear 26 is provided with pinion teeth 32 for driving engagement with worm gear 24. The interior of pinion gear 26 has a spherical socket surface 34 which snuggly receives the ball-shaped exterior surface 36 of drive nut 28, while permitting pivotal sliding movement there between. A retention lip 38 on one axial end of spherical socket 34 resiliently yields outwardly to permit the drive nut to be snapped into place in the direction from top to bottom as viewed in FIG. 4, thereby releasably retaining the drive nut within the pinion gear.

The interior of pinion gear 26 is further provided with a pair of diametrically opposite longitudinally extending driving splines 40 which cooperate with external grooves 42 in the spherical surface 36 of drive nut 28 (see FIG. 1). The ends of grooves 42 are widened or flared to permit the ball to pivot relative to pinion gear 26 about each of the two axes mutually perpendicular to the longitudinal axis of the pinion gear.

Drive nut 28 has a threaded bore 44 which is dimensioned to provide radial clearance with the unthreaded shaft portion 46 of actuator screw 14. The tip of actuator screw 14 is provided with ball 48 and transverse pins 50 which, in conventional fashion, establish a non-rotatable connection between actuator screw 14 and a slotted socket in the unillustrated back of the mirror.

Figure 5:
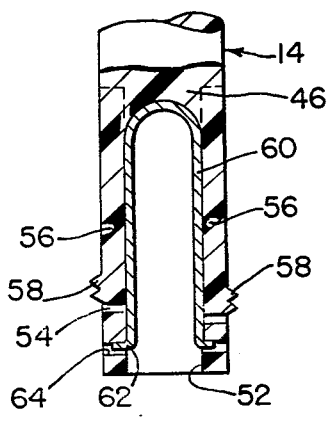
FIG. 5 is a sectional fragmentary view of the screw, viewed in the direction of arrows 5—5 of FIG. 3.

Actuator screw 14 has a square bore 52 extending along a portion of its length, and diametrically opposite sides of shaft portion 46 have a pair of U-shaped slots extending from the outer surface to bore 52 to define a pair of fingers 56 which are resiliently yieldable in the radial direction relative to the main body of shaft portion 46. The free ends of fingers 56 have an outwardly extending pair of thread segments 58 (see FIG. 5) dimensioned to normally engage the internal threads of bore 44 of nut 28. A hairpin-shaped spring 60 is received within bore 52 of screw 14. The legs of screw 60 normally maintain threaded fingers 56 in their thread-engaging position shown in FIG. 5, but permit fingers to yield resiliently inwardly to disengage the threads in an override or overload condition. Tips 62 of spring 60 are received in slots 64 of screw 14 to anchor the spring in position and to limit the radially outward movement of the legs of the spring and of fingers 56, thereby limiting the outward engagement forces on the thread elements.

In operation, selective actuation of one of the motors, by conventional means not forming a portion of this invention, causes rotation of the associated worm gear 24 which in turn causes pinion gear 26 and drive nut 28 to rotate. Rotation of drive nut 28 causes longitudinal movement of actuator screw 14, because pins 50 of the screw engage are anchored in slots in the back of the mirror to prevent the screw from rotating. Such longitudinal movement causes the mirror to pivot about one of its two axes of pivotal freedom, i.e., axis 16 or axis 18 of FIG. 2. As the mirror pivots and its point of connection to tip 48 of actuator screw 14 travels along an arc, the ball and socket portions of pinion gear 26 and drive nut 28 permit the axis of actuator screw 14 to pivot to follow such arc of movement, thereby assuring a smooth and continuous driving relationship throughout the travel of the mirror.

In the event that the motor-controlling switch continues to provide current to the motor after the mirror has reached the limit of its travel, continued rotation of drive nut 28 after screw shaft 14 can no longer move longitudinally will cause the internal threads of the drive nut to resiliently force threaded fingers 56 of actuator screw 14 to yield inwardly against the outward bias of spring 60, thereby permitting such continued rotation of motor 11, pinion gear 26 and drive nut 28 without damage to any of the components. Similarily, in the event that the mirror is manually repositioned, while motor 11 is inoperative, the resulting longitudinal movement of actuator screw 14 relative to the nonrotating drive nut 28 will similarly cause threaded fingers 56 to resiliently yield in a radially inward direction to disengage the threads and accomodate such relative movement.

In the preferred embodiment, the housing, worm gear and actuator screw are made of duPont Delrin 500, while the pinion gear and drive nut are made of duPont 801 nylon. The interference between retention lip 38 and the diameter of drive nut 28 is 0.008 inches, while the interferences at the other end of socket 34 is 0.080 inches. The diameter of the spherical surface of the ball nut is 0.514 inches and that of the spherical socket is 0.518 inches.

This invention may be further developed within the scope of the following claims. Accordingly, the above specification is to be interpreted as illustrative of only a single operative embodiment of the present invention, rather than in a stricly limited sense.

I now claim:

1. In a remote control system for a vehicle mirror of the type characterized by a mirror mounted for pivotal movement relative to a base, electric motor means secured to the base and having a worm gear on its output shaft which engages an externally threaded pinion gear rotatably mounted on the base, and wherein the pinion gear is also provided with internal threads to serve as a nut, the rotation of which by the worm gear causes a non-rotatable mirror-engaging screw shaft in threaded engagement with the internal threads of the nut to move longitudinally to reposition the mirror, the improvement which comprises:

the pinion and nut being formed as two separate but concentrically connected elements, the first of said elements being in the form of an annulus having external pinion gear teeth adapted to be rotatably drive about a first axis by the motor-driven worm gear, said annulus having a spherical socket surface on the interior of the annulus, the second of said elements being in the form of a second annulus having a ball-shaped surface on its exterior circumference dimensioned to be snugly but rotatably received in and retained by said spherical socket surface, and said second element having internal nut threads on the interior of said second annulus for driving engagement with a screw shaft, driving formations on said first and second elements for causing the rotation of said first element by the worm gear to produce concurrent rotation of said second element about said first axis, said spherical surfaces and said driving formations permitting relative pivotal movement between said first and second elements about the two mutually perpendicular axes which are perpendicular to said first axis;

whereby actuation of the motor produces mirror position-adjusting longitudinal movement of the screw shaft, while said spherical surfaces permit the axis of the screw shaft to pivot in response to movement of the screw shaft-to-mirror engagement point transverse to the screw shaft axis in response to pivotal movement of the mirror.

2. The pinion and nut of claim 1 wherein said driving formations comprise splines arranged parallel to said first axis, the grooves thereof being wider at their ends than in their intermediate portions, to permit the axes of said pinion and nut to be skewed relative to each other.

3. The pinion and nut of claim 1 wherein a slight interference fit between the greatest diameter of said ball-shaped surface and a receiving opening at one end of said spherical socket surface within said first element requires an axial force to snap together said elements, said spherical socket thereafter retaining said elements together.

4. The remote control system of claim 1 wherein the screw shaft is provided with radially flexible teeth capable of resiliently yielding in a radially inward direction to disengage from said internal nut threads when a driving force applied to one of said nut and said screw shaft is opposed by a predetermined resistance to responsive movement of the other of said nut and said screw shaft.

* * * * *